US006649663B1

(12) United States Patent
Klipper et al.

(10) Patent No.: US 6,649,663 B1
(45) Date of Patent: Nov. 18, 2003

(54) PROCESS FOR PREPARING MONODISPERSE ION EXCHANGERS HAVING CHELATING FUNCTIONAL GROUPS AND THE USE THEREOF

(75) Inventors: Reinhold Klipper, Köln (DE); Werner Strüver, Leverkusen (DE); Ulrich Schnegg, Leverkusen (DE); Bruno Hees, Langenfeld (DE); Bernhard Lehmann, Aachen (DE); Holger Lütjens, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/643,049

(22) Filed: Aug. 21, 2000

(30) Foreign Application Priority Data

Aug. 27, 1999 (DE) .......................................... 199 40 866
Nov. 12, 1999 (DE) .......................................... 199 54 399

(51) Int. Cl.⁷ .................................................. C08F 8/30
(52) U.S. Cl. ............................ 521/32; 521/30; 521/33; 525/375; 526/218.1; 526/219.6; 526/228; 526/230.5; 526/232.1
(58) Field of Search ..................... 521/32, 30; 525/375; 526/219.6

(56) References Cited

U.S. PATENT DOCUMENTS

| | | | | |
|---|---|---|---|---|
| 3,006,866 A | * | 10/1961 | Corte | |
| 3,586,646 A | | 6/1971 | Corte et al. | |
| 3,716,482 A | | 2/1973 | Corte et al. | .................... 210/37 |
| 3,994,719 A | * | 11/1976 | Corte | |
| 4,002,564 A | * | 1/1977 | Carbonel | .................. 210/38 R |
| 4,217,417 A | * | 8/1980 | Smith | ......................... 435/180 |
| 4,382,124 A | | 5/1983 | Meitzner et al. | .............. 521/38 |
| 4,419,245 A | | 12/1983 | Barrett et al. | ............... 210/681 |
| 4,427,794 A | | 1/1984 | Lange et al. | .................. 521/28 |
| 4,444,961 A | | 4/1984 | Timm | ........................... 526/80 |
| 4,952,608 A | * | 8/1990 | Klipper | ...................... 521/32 |
| 5,231,115 A | | 7/1993 | Harris | ........................ 521/28 |
| 5,278,193 A | * | 1/1994 | Eiffler | ......................... 521/31 |
| 5,804,606 A | * | 9/1998 | Surowiec | ..................... 521/32 |

* cited by examiner

*Primary Examiner*—Fred Zitomer
(74) *Attorney, Agent, or Firm*—Godfried R. Akorli; Diderico van Eyl

(57) ABSTRACT

The present invention relates to a process for preparing novel, monodisperse ion exchangers having chelating functional groups, and their use for adsorbing metal compounds, in particular, heavy metal compounds and noble metal compounds, and also for extracting alkaline-earth metals from saline solutions from alkali metal chloride electrolysis.

16 Claims, No Drawings

PROCESS FOR PREPARING MONODISPERSE ION EXCHANGERS HAVING CHELATING FUNCTIONAL GROUPS AND THE USE THEREOF

BACKGROUND OF THE INVENTION

The present invention relates to a process for preparing novel, monodisperse ion exchangers having chelating functional groups, and to the use of these.

U.S. Pat. No. 4,444,961 discloses a process for preparing monodisperse, macroporous chelating resins. In this process, haloalkylated polymers are aminated and the aminated polymer is reacted with chloroacetic acid to give chelating resins of iminodiacetic acid type.

A disadvantage of this process is post-crosslinking at the haloalkylated bead polymers stage of the process and also at the subsequent aminomethylated bead polymers stage of the process. EP-A 481,603 describes the disadvantages of post-crosslinking arising at these two stages and a method for the minimization thereof.

The present invention provides hitherto unknown monodisperse chelating resins whose preparation avoids the haloalkylated intermediate stage, and also the use of these.

The novel process does away with post-crosslinking.

The novel products have a uniform structure. Surprisingly, it has been found that the absence of post-crosslinking allows a relatively high degree of substitution of the aromatic rings with functional groups to be achieved and thus a relatively high exchange capacity in the final product. The yield of final product, based on the monomers used, is moreover markedly higher than is the case with final products prepared according to the prior art.

SUMMARY OF THE INVENTION

The present invention, therefore, provides a process for preparing monodisperse ion exchangers having chelating functional groups comprising (a) reacting monomer droplets made from at least one monovinylaromatic compound and at least one polyvinylaromatic compound, and, if desired, a porogen and/or, if desired, an initiator or an initiator combination to give a monodisperse, crosslinked bead polymer, (b) amidomethylating the monodisperse, crosslinked bead polymer from step (a) with phthalimide derivatives, (c) converting the amidomethylated bead polymer from step (b) to an aminomethylated bead polymer, and (d) converting the aminomethylated bead polymer from step (c) to ion exchangers having chelating groups.

DETAILED DESCRIPTION OF THE INVENTION

The novel ion exchangers with the properties described above are obtained without post-crosslinking. Furthermore, the monodisperse ion exchangers prepared according to the present invention and having chelating groups give markedly better removal of heavy metals and noble metals from aqueous solutions or organic liquids or vapors thereof, particularly of mercury from aqueous solutions of alkaline-earth metals or alkali metals, in particular removal of mercury from saline solutions from alkali metal chloride electrolysis, give markedly better removal of heavy metals, particularly mercury or arsenic, from aqueous hydrochloric acid, particularly from waste water from flue gas scrubber effluent but also from landfill eluate or groundwater, give markedly better removal of heavy metals, particularly mercury or arsenic, or noble metals, from liquid or gaseous hydrocarbons, such as natural gases, natural gas condensates, or mineral oils, or halogenated hydrocarbons, such as chloro- or fluorohydrocarbons, give markedly better removal of elements of the platinum group or gold or silver from aqueous or organic solutions, and give markedly better removal of rhodium or elements of the platinum group or gold or silver or of rhodium- or noble-metal-containing catalyst residues from organic solutions or solvents, and give markedly better removal of alkaline-earth metals, such as magnesium, calcium, barium or strontium, from aqueous saline solutions, as usually produced in alkali metal chloride electrolysis, than do the chelating resins known from the prior art.

The novel ion exchangers are, therefore, highly suitable for a very wide variety of application sectors in the chemical industry, the electronics industry, or industries that dispose of or recycle waste, or in electroplating or surface-finishing.

The monodisperse, crosslinked vinylaromatic base polymer according to process step (a) may be prepared by the processes known from the literature. Processes of this type are described, for example, in U.S. Pat. No. 4,444,961, EP-A 46,535, U.S. Pat. No. 4,419,245, or WO 93/12167, the contents of which are incorporated into the present application in relation to process step (a).

In process step (a), at least one monovinylaromatic compound and at least one polyvinylaromatic compound are used. However, it is also possible to use mixtures of two or more monovinylaromatic compounds and mixtures of two or more polyvinylaromatic compounds.

Preferred monovinylaromatic compounds for the purposes of the present invention in process step (a) are monoethylenically unsaturated compounds, such as, styrene, vinyltoluene, ethylstyrene, α-methylstyrene, chlorostyrene, chloromethylstyrene, alkyl acrylates, and alkyl methacrylates. Particular preference is given to the use of styrene or mixtures of styrene with the above-mentioned monomers.

Preferred polyvinylaromatic compounds for the purposes of the present invention for process step (a) are multifunctional ethylenically unsaturated compounds, such as, divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate, or allyl methacrylate.

The amounts used of the polyvinylaromatic compounds are generally from 1 to 20% by weight (preferably from 2 to 12% by weight, particularly preferably from 4 to 10% by weight), based on the monomer or its mixture with other monomers. The nature of the polyvinylaromatic compounds (crosslinking agents) is selected with the subsequent use of the spherical polymer in mind. In many cases divinylbenzene is suitable. For most uses, commercial qualities of divinylbenzene are sufficient, and comprise ethylvinylbenzene, besides the divinylbenzene isomers.

In one preferred embodiment of the present invention, microencapsulated monomer droplets are used in process step (a).

Possible materials for the microencapsulation of the monomer droplets are those known for use as complex coacervates, in particular, polyesters, natural or synthetic polyamides, polyurethanes, and polyureas.

An example of a particularly suitable natural polyamide is gelatin, which is used, in particular, as coacervate and complex coacervate. For the purposes of the present invention, gelatin-containing complex coacervates are primarily combinations of gelatin with synthetic polyelectrolytes. Suitable synthetic polyelectrolytes are copolymers incorporating units of, for example, maleic acid, acrylic acid, methacrylic acid, acrylamide, or methacrylamide. Particular preference is given to the use of acrylic acid and acrylamide. Gelatin-containing capsules may be hardened using conventional hardeners, such as formaldehyde or glutaric dialdehyde. The encapsulation of monomer droplets with gelatin, with gelatin-containing coacervates and with gelatin-containing complex coacervates is described in detail in EP-A 46,535. The methods for encapsulation using synthetic polymers are known. An example of a highly suitable process is interfacial condensation, in which a reactive component dissolved in the monomer droplet (for example, an isocyanate or an acid chloride) is reacted with a second reactive component dissolved in the aqueous phase (for example, an amine).

The monomer droplets, which may be microencapsulated if desired, may, if desired, contain an initiator or mixtures of initiators to initiate the polymerization. Examples of initiators suitable for the novel process are peroxy compounds, such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane, and tert-amylperoxy-2-ethylhexane, and azo compounds, such as 2,2'-azobis(isobutyronitrile) and 2,2'-azobis(2-methylisobutyronitrile).

The amounts used of the initiators are generally from 0.05 to 2.5% by weight (preferably from 0.1 to 1.5% by weight), based on the mixture of monomers.

To create a macroporous structure in the spherical polymer, it is possible, if desired, to use porogens as other additives in the optionally microencapsulated monomer droplets. Suitable compounds for this purpose are organic solvents which are poor solvents and, respectively, swelling agents for the polymer produced. Examples that may be mentioned are hexane, octane, isooctane, isododecane, methyl ethyl ketone, butanol, and octanol and isomers thereof.

The concepts "microporous" or "gel" and "macroporous" have been described in detail in the technical literature.

Bead polymers preferred for the purposes of the present invention and prepared in process step (a) have a macroporous structure.

Substances that are monodisperse for the purposes of the present application are those for which the diameter of at least 90% by volume or by weight of the particles varies from the most frequent diameter by not more than ±10% of the most frequent diameter.

For example, in the case of a substance with a most frequent diameter of 0.5 mm, at least 90% by volume or by weight have a size range from 0.45 to 0.55 mm, and in the case of a substance with a most frequent diameter of 0.7 mm, at least 90% by weight or by volume have a size range from 0.77 mm to 0.63 mm.

Monodisperse macroporous bead polymers may be produced, for example, by adding inert materials (porogens) to the monomer mixture during the polymerization. Suitable substances of this type are primarily organic substances that dissolve in the monomer but are poor solvents and, respectively, swelling agents for the polymer (precipitants for polymers), for example, aliphatic hydrocarbons (Farbenfabriken Bayer DBP 1045102,1957; DBP 1113570, 1957).

U.S. Pat. No. 4,382,124, for example, uses alcohols having from 4 to 10 carbon atoms as porogen for preparing monodisperse, macroporous bead polymers based on styrene/divinylbenzene. An overview of preparation methods for macroporous bead polymers is also given.

The monomer droplets, which may be microencapsulated if desired, may also, if desired, comprise up to 30% by weight (based on the monomer) of crosslinked or non-crosslinked polymer. Preferred polymers derive from the above-mentioned monomers, particularly, preferably, from styrene.

The average particle size of the monomer droplets, which may be encapsulated if desired, is from 10 to 1000 $\mu$m, preferably from 100 to 1000 $\mu$m. The novel process is also very suitable for preparing monodisperse spherical polymers.

When monodisperse bead polymers are prepared according to process step (a) the aqueous phase may, if desired, comprise a dissolved polymerization inhibitor. Both inorganic and organic substances are possible inhibitors for the purposes of the present invention. Examples of inorganic inhibitors are nitrogen compounds, such as, hydroxylamine, hydrazine, sodium nitrite, and potassium nitrite, salts of phosphorous acid, such as sodium hydrogenphosphite, and sulfur-containing compounds, such as sodium dithionite, sodium thiosulfate, sodium sulfite, sodium bisulfite, sodium thiocyanate, and ammonium thiocyanate. Examples of organic inhibitors are phenolic compounds, such as, hydroquinone, hydroquinone monomethyl ether, resorcinol, pyrocatechol, tert-butyl-pyrocatechol, pyrogallol, and condensation products made from phenols with aldehydes. Other suitable organic inhibitors are nitrogen-containing compounds, including hydroxylamine derivatives, such as N,N-diethylhydroxylamine, N-isopropylhydroxylamine, and sulfonated or carboxylated derivatives of N-alkylhydroxylamine or of N,N-dialkylhydroxylamine, hydrazine derivatives, such as, N,N-hydrazinodiacetic acid, nitroso compounds, such as, N-nitrosophenylhydroxylamine, the ammonium salt of N-nitrosophenylhydroxylamine, or the aluminum salt of N-nitrosophenylhydroxylamine. The concentration of the inhibitor is from 5 to 1000 ppm (based on the aqueous phase), preferably from 10 to 500 ppm, particularly, preferably from 10 to 250 ppm.

As mentioned above, the polymerization of the optionally microencapsulated monomer droplets to give the spherical monodisperse bead polymer may, if desired, take place in the presence of one or more protective colloids in the aqueous phase. Suitable protective colloids are natural or synthetic water-soluble polymers, such as, gelatin, starch, polyvinyl alcohol, polyvinylpyrrolidone, polyacrylic acid, polymethacrylic acid, or copolymers made from (meth)acrylic acid and from (meth)acrylates. Other very suitable materials are cellulose derivatives, particularly cellulose esters and cellulose ethers, such as, carboxymethylcellulose, methylhydroxyethylcellulose, methylhydroxypropylcellulose, and hydroxyethylcellulose. Gelatin is particularly suitable. The amount used of the protective colloids is generally from 0.05 to 1% by weight (preferably from 0.05 to 0.5% by weight), based on the aqueous phase.

The polymerization to give the spherical, monodisperse, macroporous bead polymer in process step (a) may, if desired, also be carried out in the presence of a buffer system. Preference is given to buffer systems that set the pH of the aqueous phase at the beginning of the polymerization to between 14 and 6 (preferably between 12 and 8). Under these conditions, protective colloids having carboxylic acid groups are present to some extent or entirely in the form of salts, which has a favorable effect on the action of the protective colloids. Particularly suitable buffer systems comprise phosphate salts or borate salts. For the purposes of the present invention, the terms phosphate and borate also include the condensation products of the ortho forms of corresponding acids and salts. The concentration of the phosphate or borate in the aqueous phase is from 0.5 to 500 mmol/l, preferably from 2.5 to 100 mmol/l.

The stirring speed during the polymerization is relatively non-critical and, unlike in conventional bead polymerization, has no effect on the particle size. The stirring speeds used are low speeds which are sufficient to keep the monomer droplets in suspension and to promote dissipation of the heat of polymerization. A variety of stirrer types can be used for this task. Gate stirrers with an axial action are particularly suitable.

The ratio by volume of encapsulated monomer droplets to aqueous phase is from 1:0.75 to 1:20, preferably from 1:1 to 1:6.

The polymerization temperature depends on the decomposition temperature of the initiator used and is generally from 50 to 180° C. (preferably from 55 to 130° C.). The polymerization takes from 0.5 hour to a few hours. It has proven successful to use a temperature program in which the polymerization is begun at a low temperature (for example, 60° C.) and the reaction temperature is raised as the polymerization conversion progresses. This is a very good way of fulfilling, for example, the requirement for a reaction that proceeds reliably and with a high polymerization conversion. After polymerization, the polymer is isolated using conventional methods (for example, by filtration or decanting) and washed if desired.

In process step (b) the amidomethylating reagent is first prepared. This is done, for example, by dissolving a phthalimide or a phthalimide derivative in a solvent and mixing with formalin. A bis(phthalimido) ether is then formed from this material with elimination of water. The bis(phthalimido) ether may, if desired, be reacted to give the phthalimido ester. For the purposes of the present invention, preferred phthalimide derivatives are phthalimide itself and substituted phthalimides such as methylphthalimide.

Solvents used in process step (b) are inert and suitable for swelling the polymer and are preferably chlorinated hydrocarbons, particularly, preferably dichloroethane or methylene chloride.

In process step (b) the bead polymer is condensed with phthalimide derivatives. The catalyst used here comprises oleum, sulfuric acid, or sulfur trioxide.

The elimination of the phthalic acid residue, and with this the release of the aminomethyl group, takes place in process step (c) via treatment of the phthalimidomethylated crosslinked bead polymer with aqueous or alcoholic solutions of an alkali metal hydroxide, such as, sodium hydroxide or potassium hydroxide, at temperatures of from 100 to 250° C. (preferably from 120 to 190° C.). The concentration of the aqueous sodium hydroxide is from 10 to 50% by weight, preferably from 20 to 40% by weight. This process allows the preparation of crosslinked bead polymers containing aminoalkyl groups with substitution of the aromatic rings at a level greater than 1.

The resultant aminomethylated bead polymer is finally washed with deionized water until free of alkali.

In process step (d) the novel ion exchangers are prepared by reacting the monodisperse, crosslinked vinylaromatic base polymer containing aminomethyl groups in suspension with compounds which finally develop the chelating properties of a functionalized amine.

Preferred reagents in process step (d) are chloroacetic acid and its derivatives; formalin in combination with acid P—H (by modified Mannich reaction) compounds, such as, phosphorous acid, monoalkylphosphorous esters, or dialkylphosphorous esters; formalin in combination with acidic S—H compounds, such as, thioglycolic acid or alkyl mercaptans, or L-cystine; or formalin in combination with hydroxyquinoline and its derivatives. Particular preference is given to the use of chloroacetic acid or formalin in combination with acid P-H compounds, such as, phosphorous acid.

The suspension medium used comprises water or aqueous mineral acids, preferably water, aqueous hydrochloric acid, or aqueous sulfuric acid at concentrations of from 10 to 40% by weight (preferably from 20 to 35% by weight).

The present invention also provides monodisperse ion exchangers prepared by the novel process and having chelating groups.

The novel process preferably gives monodisperse ion exchangers having the following chelating groups that form during process step (d):

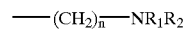

wherein
$R_1$ is hydrogen or a radical $CH_2$—COOH or $CH_2 P(O)(OH)_2$,
$R_2$ is a radical $CH_2COOH$ or $CH_2P(O)(OH)_2$, and
$n$ is an integer from 1 to 4.

The novel ion exchangers having chelating functional groups preferably have a macroporous structure.

The ion exchangers prepared according to the invention and having chelating functional groups are suitable for adsorbing metals, in particular, heavy metals and noble metals and compounds of these from aqueous solutions or organic liquids. The ion exchangers prepared according to the invention and having chelating groups are particularly suitable for removing heavy metals or noble metals from aqueous solutions, in particular, from aqueous solutions of alkaline-earth metals or alkali metals, from saline solutions from alkali metal chloride electrolysis, from aqueous hydrochloric acid, from waste water or flue gas scrubber effluent, from ground water or landfill eluate, from liquid or gaseous hydrocarbons, carboxylic acids, such as, adipic acid, glutaric acid, or succinic acid, natural gases, natural gas condensates, mineral oils, or from halogenated hydrocarbons, such as, chloro- or fluorohydrocarbons or fluoro/chlorohydrocarbons. The novel ion exchangers are moreover suitable for removing alkaline-earth metals from saline solutions such as usually used in alkali metal chloride electrolysis. The novel ion exchangers are also suitable for removing heavy metals, in particular, iron, cadmium, or lead, from substances that are converted by an electrolytic treatment, for example, during dimerization of acrylonitrile to give adiponitrile.

The ion exchangers prepared according to the invention are very particularly suitable for removing mercury, iron, cobalt, nickel, copper, zinc, lead, cadmium, manganese, uranium, vanadium, elements of the platinum group, or gold or silver, from the gases, liquids, or solutions listed above.

The novel ion exchangers are particularly suitable for removing rhodium or elements of the platinum group, or gold or silver, or rhodium- or noble-metal-containing catalyst residues from organic solutions or solvents.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Determination of the amount of chelating groups—total capacity (TC) of the resin:

100 ml of exchanger are placed in a filter column and eluted using 3% strength by weight hydrochloric acid over a period of 1.5 hours. This is followed by washing with deionized water until the eluate is neutral.

50 ml of regenerated ion exchanger are treated with 0,1 N aqueous sodium hydroxide in a column. Each 250 ml of eluate is collected in a measuring cylinder and the entire amount is titrated against methyl orange with 1 N hydrochloric acid.

The solution continues to be applied until 250 ml of eluate consume from 24.5 to 25 ml of 1N hydrochloric acid. Once the test is over, the volume of the exchanger in the Na form is determined.

Total capacity (TC)=(X·25−ΣV)·2·10$^{-2}$ in mol/l of exchanger where

X is the number of eluate fractions

ΣV is the total consumption of 1N hydrochloric acid in ml during titration of the eluates.

Example 1

1a) Preparation of the Monodisperse Macroporous Bead Polymer Based on Styrene, Divinylbenzene, and Ethylstyrene 3000 g of deionized water were placed in a 10 liter glass reactor, and a solution made from 10 g of gelatin, 16 g of disodium hydrogen phosphate dodecahydrate, and 0.73 g of resorcinol in 320 g of deionized water was added and thoroughly mixed. The temperature of the mixture was controlled to 25° C. Then, with stirring, a mixture made from 3200 g of microencapsulated monomer droplets with a narrow particle size distribution and made from 3.6% by weight of divinylbenzene and 0.9% by weight of ethylstyrene (used in the form of a commercially available isomer mixture of divinylbenzene and ethylstyrene in 80% of divinylbenzene), 0.5% by weight of dibenzoyl peroxide, 56.2% by weight of styrene, and 38.8% by weight of isododecane (industrial isomer mixture with a high proportion of pentamethylheptane), wherein the microcapsules were composed of a formaldehyde-hardened complex coacervate made from gelatin and from a copolymer of acrylamide and acrylic acid, was introduced and 3200 g of aqueous phase with a pH of 12 was added. The average particle size of the monomer droplets was 460 μm.

The mix was polymerized to completion, with stirring, by increasing the temperature according to a temperature program starting at 25° C. and finishing at 95° C. The mix was cooled, washed using a 32 μm screen, and then dried in vacuo at 80° C. This gave 1893 g of a spherical polymer with an average particle size of 440 μm, narrow particle size distribution, and a smooth surface.

The polymer had a chalky appearance from above and had a bulk density of about 370 g/l.

1b) Preparation of the Amidomethylated Bead Polymer 2373 g of dichloroethane, 705 g of phthalimide, and 505 g of 29.2% strength by weight formalin were placed in a vessel at room temperature. The pH of the suspension was adjusted to from 5.5 to 6 using aqueous sodium hydroxide. The water was then removed by distillation. 51.7 g of sulfuric acid were then metered in and the resultant water was removed by distillation. The mix was cooled. 189 g of 65% strength oleum were metered in at 30° C., followed by 371.4 g of monodisperse bead polymer prepared according to process step la). The suspension was heated to 70° C. and stirred for a further 6 hours at this temperature. The reaction liquid was drawn off, deionized water was metered in, and residual dichloroethane was removed by distillation.

Yield of amidomethylated bead polymer: 2140 ml; Composition by elemental analysis: carbon: 75.3% by weight; hydrogen: 4.9% by weight; nitrogen: 5.8% by weight; remainder oxygen.

1c) Preparation of the Aminomethylated Bead Polymer 1019 g of 45% strength by weight aqueous sodium hydroxide and 406 ml of deionized water were metered at room temperature into 2100 ml of amidomethylated bead polymer. The suspension was heated to 180° C. and stirred for 6 hours at this temperature.

The resultant bead polymer was washed with deionized water.

Yield of aminomethylated bead polymer: 1770 ml; The overall yield (extrapolated) was 1804 ml. Composition by elemental analysis: nitrogen: 11.75% by weight.

From the composition of the aminomethylated bead polymer by elemental analysis, it could be calculated that on statistical average per aromatic ring—stemming from the styrene and divinylbenzene units-1.17 hydrogen atoms were substituted by aminomethyl groups.

1d) Preparation of the Ion Exchanger Having Chelating Groups.

1180 ml of aminomethylated bead polymer from Example 1c) were metered into 1890 ml of deionized water. 729.2 g of sodium monochloro-acetate were metered into this suspension. The mixture was stirred at room temperature for 30 minutes. The pH of the suspension was then adjusted to pH 10 using 20% strength by weight aqueous sodium hydroxide. The suspension was heated to 80° C. within a period of 2 hours and then stirred for a further 10 hours at this temperature. During this time the pH was held at 10 by controlled addition of aqueous sodium hydroxide. The suspension was then cooled. The resin was washed with deionized water until free from chloride.

Yield: 2190 ml; total capacity of the resin: 2.39 mol/l of resin.

What is claimed is:

1. A process for preparing monodisperse ion exchangers having chelating functional groups comprising (a) reacting monomer droplets made from at least one monovinylaromatic compound and at least one polyvinylaromatic compound to give a monodisperse, crosslinked bead polymer, (b) amidomethylating the monodisperse, crosslinked bead polymer from step (a) with phthalimide or methylphthalimide, (c) converting the amidomethylated bead polymer from step (b) to an aminomethylated bead polymer, and (d) converting the aminomethylated bead polymer from step (c) to ion exchangers having chelating groups of the formula

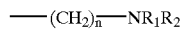

wherein
  $R_1$ is hydrogen or a radical $CH_2$—COOH or $CH_2$ P(O)(OH)$_2$,
  $R_2$ is a radical $CH_2COOH$ or $CH_2P(O)(OH)_2$, and
  n is an integer from 1 to 4.

2. A process according to claim 1 wherein the monomer droplets are microencapsulated using a complex coacervate.

3. A process according to claim 1 wherein step (a) is carried out in the presence of a protective colloid.

4. A process according to claim 1 wherein step (a) is carried out in the presence of at least one initiator.

5. A process according to claim 1 wherein the monomer droplets comprise porogens that, after the polymerization, form macroporous, crosslinked bead polymers.

6. A process according to claim 1 wherein a polymerization inhibitor is used in step (a).

7. A process according to claim 3 wherein the protective colloids are gelatin, starch, polyvinyl alcohol, polyvinylpyrrolidone, polyacrylic acid, polymethacrylic acid, copolymers made from (meth)acrylic acid or (meth)acrylate, or mixtures thereof.

8. A process according to claim 1 wherein the monovinylaromatic compounds are monoethylenically unsaturated compounds.

9. A process according to claim 1 wherein the polyvinylaromatic compounds are divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate, allyl methacrylate, or mixtures thereof.

10. A process according to claim 1 wherein the initiator is a peroxy compound or an azo compound.

11. A process according to claim 10 wherein the initiator is dibenzoyl peroxide, dilauroyl peroxide, bis-(p-chlorobenzoyl) peroxide, dicyclohexyl peroxydicarbonate, tert-butyl peroctoate, tert-butyl peroxy-2-ethyl-hexanoate, 2,5-bis-(2-ethylhexanoylperoxy)-2,5-dimethylhexane, or tert-amylperoxy-2-ethylhexane.

12. A process according to claim 10 wherein the initiator is 2,2'-azobis(isobutyronitrile) or 2,2'-azobis-(2-methylisobutyronitrile).

13. A process according to claim 1 wherein a phthalimido ether is formed in step (b).

14. A process according to claim 13 wherein the phthalimido ether is prepared from phthalimide or methylphthalimide and formalin.

15. A process according to claim 13 wherein the reaction of the phthalimido ether with the bead polymer takes place in the presence of oleum, sulfuric acid, or sulfur trioxide.

16. A process according to claim 1 wherein step (d) is carried out using compounds that develop the chelating group from the aminomethylated bead polymer.

* * * * *